(12) United States Patent
Huang et al.

(10) Patent No.: US 11,333,609 B2
(45) Date of Patent: May 17, 2022

(54) REAL-TIME DETECTION DEVICE AND METHOD FOR DOMESTIC WASTE COMPONENTS IN AN INCINERATOR

(71) Applicant: ZHEJIANG UNIVERSITY, Hangzhou (CN)

(72) Inventors: Qunxing Huang, Hangzhou (CN); Yafei Wang, Hangzhou (CN); Shoukang Wang, Hangzhou (CN); Yong Chi, Hangzhou (CN); Xiaodong Li, Hangzhou (CN); Fei Wang, Hangzhou (CN); Shengyong Lu, Hangzhou (CN); Jianhua Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 471 days.

(21) Appl. No.: 16/494,384

(22) PCT Filed: Jan. 31, 2019

(86) PCT No.: PCT/CN2019/074109
§ 371 (c)(1),
(2) Date: Sep. 16, 2019

(87) PCT Pub. No.: WO2019/154248
PCT Pub. Date: Aug. 15, 2019

(65) Prior Publication Data
US 2020/0240920 A1    Jul. 30, 2020

(30) Foreign Application Priority Data

Feb. 12, 2018  (CN) .......................... 201810147535.X

(51) Int. Cl.
*G01N 21/72* (2006.01)
*F23G 5/50* (2006.01)
*G01J 3/02* (2006.01)

(52) U.S. Cl.
CPC .............. *G01N 21/72* (2013.01); *F23G 5/50* (2013.01); *G01J 3/0218* (2013.01); *F23G 2207/1015* (2013.01)

(58) Field of Classification Search
CPC ........... G01N 21/72; G01J 3/0218; F23G 5/50
See application file for complete search history.

(56) References Cited

U.S. PATENT DOCUMENTS

| 5,252,060 A * | 10/1993 | McKinnon | G01N 21/39 |
| | | | 250/338.5 |
| 2004/0216510 A1* | 11/2004 | Gilby | G01N 30/8665 |
| | | | 702/89 |
| 2010/0062381 A1* | 3/2010 | Gross | F23N 5/00 |
| | | | 431/12 |

FOREIGN PATENT DOCUMENTS

| CN | 101625270 | 1/2010 |
| CN | 107561015 | 1/2018 |
| WO | WO9745677 | 12/1997 |

\* cited by examiner

*Primary Examiner* — Nathaniel Herzfeld
(74) *Attorney, Agent, or Firm* — Jiwen Chen; Jacobson Holman PLLC

(57) ABSTRACT

The present invention relates to a real-time detection device for municipal solid waste components in an incinerator. The real-time detection device includes: an optical fiber sensor, which faces combustion flame of municipal solid waste combustion region through an observation hole in the incinerator; a spectrometer, which is used for receiving optical signal of the optical fiber sensor; an industrial personal computer, which is used for receiving data of the spectrometer and outputting the municipal solid waste components according to a municipal solid waste component detection program; the municipal solid waste component detection program obtains combustion flame spectral information of municipal solid waste in the incinerator by utilizing the optical fiber sensor and the spectrometer, and detects the municipal solid waste components in real time based on combustion flame spectrum of a single waste component. The present invention further relates to a real-time detection method for municipal solid waste components in an incinerator. Compared with manual classified sampling and detection, the device and method provided by the present invention have the advantages of high efficiency, rapidness, accuracy, capability of being updated in real time; and can realize stable combustion of the municipal solid waste in the incinerator, and reduce emission of pollutants and realize efficient and clean utilization of the municipal solid waste.

8 Claims, 9 Drawing Sheets

REAL-TIME DETECTION DEVICE AND METHOD FOR DOMESTIC WASTE COMPONENTS IN AN INCINERATOR

This is a U.S. national stage application of PCT Application No. PCT/CN2019/074109 under 35 U.S.C. 371, filed Jan. 31, 2019 in Chinese, claiming priority of Chinese Application No. 201810147535.X, filed Feb. 12, 2018, all of which is hereby incorporated by reference.

TECHNICAL FIELD

The present invention relates to technical field of municipal solid waste incineration, in particular to a real-time detection device and method for municipal solid waste components in an incinerator.

DESCRIPTION OF RELATED ART

Component information of municipal solid waste is very important for municipal solid waste power plants. The heat input and pollutant discharge of boilers can be estimated by component information of municipal solid waste, which is very important for stable combustion of municipal solid waste in an incinerator and efficient and clean utilization of the municipal solid waste. At present, most waste components of municipal solid waste power plants have huge differences and great randomness. Even after crushing, the physical and chemical properties are not as stable as coal fuels, and the cost for making the municipal solid waste into a shaped refuse derived fuel (RDF) is expensive.

At present, the general practice to obtain the components of municipal solid waste at home and abroad is to sample the waste in the warehouse in a fixed period. The commonly used sampling methods of waste components in our country are quartile method, profile method, peripheral method and grid method (see sampling and analysis methods for municipal solid waste from CJT313-2009 for details), no matter which method, the cost of labor and time are very large, but due to the randomness of waste, the representativeness of sample is insufficient, so the manual classification sampling detection method is a less reliable detection method.

SUMMARY OF THE INVENTION

The present invention provides a real-time device for municipal solid waste components in an incinerator, solving the defects and shortcomings of the manual classification sampling detection method in the prior art, the detection result is more accurate, and the detection process is also safe.

A real-time detection device for municipal solid waste components in an incinerator, wherein, the real-time detection device includes:

an optical fiber sensor, which faces combustion flame of municipal solid waste combustion region through an observation hole in the incinerator;

a spectrometer, which is used for receiving optical signal of the optical fiber sensor;

an industrial personal computer, which is used for receiving data of the spectrometer and outputting the municipal solid waste components according to a municipal solid waste component detection program;

the municipal solid waste component detection program includes the following process:

(1) collecting combustion flame spectral information of the municipal solid waste components at common temperature (500° C.-1200° C.) in the incinerator and storing the information in a data base;

(2) collecting combustion flame spectral information of mixed municipal solid waste through the spectrometer;

(3) calculating the flame temperature T according to the combustion flame spectral information of mixed municipal solid waste collected in Step (2);

The formula of temperature is calculated as follows:

$$E_{\lambda_i}(T) \approx (2hC_0\lambda_i^{-5}) \cdot e^{\frac{-hC_0}{K\lambda_i T}}$$

wherein, h is Planck constant, $h=6.62606896(33) \times 10^{-34}$ J·s; $C_0$ is the speed of vacuum light, $C_0 = 299792458$ m/s; K is Boltzmann constant, $K=1.38064852(79) \times 10^{-23}$ J/K; $\lambda_i$ is wavelength, the unit is nm, taking 600~800 nm in this formula, calculating the maximum value of T;

(4) setting the number of single component of municipal solid waste to be detected as N, using $X_i$ to represent the proportion of component i, i=1~N, then the proportion of each component is represented as matrix $$\begin{bmatrix} X_1 \\ \vdots \\ X_N \end{bmatrix};$$

retrieving the combustion flame spectral information of each single component at flame temperature T calculated by Step (3)

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix},$$

and the equation is obtained:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} = \begin{bmatrix} E_{\lambda_1}(T) \\ \vdots \\ E_{\lambda_i}(T) \end{bmatrix};$$

$E_{\lambda_i}(T)$ represents the flame emission characteristic line intensity of mixed municipal solid waste at wavelength $\lambda i$ and temperature T; $I_{\lambda_i,T,E_N}$ represents the flame emission characteristic line intensity of component Ei at wavelength $\lambda i$ and temperature T;

(5) solving the equation of Step (4) to obtain the proportion of each component in the municipal solid waste.

The method of the present invention solves the problems that the waste power plant lacks the knowledge of the component information of the fuel input end, and can update the component information of the waste in the incinerator in real time, and optimize the combustion condition in the incinerator, and thus realize the clean and efficient utilization of municipal solid waste.

In order to improve calculation efficiency and accuracy, preferably, in Step (5), the equation in Step (4) is solved by the least square method to obtain the proportion of municipal solid waste components. The solution is as follows:

The equation of Step (4) can be expressed as follows:

$$\begin{cases} I_{\lambda_1,T,E_1} * X_1 + \ldots + I_{\lambda_1,T,E_N} * X_N = E_{\lambda_1}(T) \\ \ldots \\ I_{\lambda_i,T,E_1} * X_1 + \ldots + I_{\lambda_i,T,E_N} * X_N = E_{\lambda_i}(T) \end{cases};$$

The above equation has N unknown numbers and " " equations. Since the number of single component of municipal solid waste is limited, and the spectral wavelength ranges from 200 to 1800 nm (i=1600) when calculating, so the equation is an overdetermined equation. In general, the overdetermined equation has no solution and can only take approximate values, namely:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} \approx \begin{bmatrix} E_{\lambda_1}(T) \\ \vdots \\ E_{\lambda_i}(T) \end{bmatrix} \text{ or}$$

$$\begin{cases} I_{\lambda_1,T,E_1} * X_1 + \ldots + I_{\lambda_1,T,E_N} * X_N \approx E_{\lambda_1}(T) \\ \ldots \\ I_{\lambda_i,T,E_1} * X_1 + \ldots + I_{\lambda_i,T,E_N} * X_N \approx E_{\lambda_i}(T) \end{cases}$$

According to the rule of the least square method, $$r_i = E_{\lambda_i}(T) - [I_{\lambda_i,T,E_1} \ldots I_{\lambda_i,T,E_N}] \begin{bmatrix} X_1 \\ \vdots \\ X_N \end{bmatrix},$$

the set of solutions that minimizes $\Sigma(r_i)^2$ is called the square solution of the equations, which is the proportion of municipal solid waste components.

In order to improve calculation efficiency and accuracy, preferably, in Step (1), the combustion flame spectral information of municipal solid waste components at common temperature in the incinerator is represented as matrix:

$$E_X = \begin{bmatrix} I_{\lambda_1,t_1} & \cdots & I_{\lambda_1,t_j} \\ \vdots & \ddots & \vdots \\ I_{\lambda_i,t_1} & \cdots & I_{\lambda_i,t_j} \end{bmatrix}$$

wherein X represents a single component of municipal solid waste (example: printing paper, tissue paper, wood, leaf, banana peel, orange peel, chemical fiber, PP plastic, etc.); $I_{\lambda_i,t_j}$ represents the flame emission characteristic line intensity at wavelength $\lambda_i$ (Unit: nm, the same as below) and temperature $t_j$ (Unit: ° C., the same as below).

In order to improve calculation efficiency and accuracy, preferably, in Step (1), the municipal solid waste components collected include kitchen waste, paper, plastic, rubber, fabric, cellulose, bamboo, peel and lignin.

The present invention also provides a real-time detection method for municipal solid waste components in an incinerator, the real-time detection method includes following process:

(1) collecting combustion flame spectral information of the municipal solid waste components at common temperature in the incinerator and storing it in the information base;

(2) collecting combustion flame spectral information of mixed municipal solid waste through the spectrometer;

(3) calculating the flame temperature T according to the combustion flame spectral information of mixed municipal solid waste collected in Step (2);

(4) setting the number of single components of municipal solid waste to be detected as N, using $X_i$ to represent the proportion of component i, i=1~N, then the proportion of each component is represented as matrix $$\begin{bmatrix} X_1 \\ \vdots \\ X_N \end{bmatrix};$$

retrieving the combustion flame spectral information of each single component at flame temperature $$T \begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix}$$

calculated by Step (3), and the equation is obtained:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} = \begin{bmatrix} E_{\lambda_1}(T) \\ \vdots \\ E_{\lambda_i}(T) \end{bmatrix};$$

$E_{\lambda_i}(T)$ represents the flame emission characteristic line intensity of mixed municipal solid waste at wavelength $\lambda i$ and temperature T; $I_{\lambda_i,T,E_N}$ represents the flame emission characteristic line intensity of component Ei at wavelength $\lambda i$ and temperature T;

(5) solving the equation of Step (4) to obtain the proportion of each component in the municipal solid waste.

In Step (5), the equation in step (4) is solved by the least square method to obtain the proportion of municipal solid waste components.

In Step (1), the combustion flame spectral information of the municipal solid waste components at common temperature in the incinerator is represented as matrix:

$$E_X = \begin{bmatrix} I_{\lambda_1,t_1} & \cdots & I_{\lambda_1,t_j} \\ \vdots & \ddots & \vdots \\ I_{\lambda_i,t_1} & \cdots & I_{\lambda_i,t_j} \end{bmatrix}$$

wherein X represents a single component of municipal solid waste;

$I_{\lambda_i,t_j}$ represents the flame emission characteristic line intensity at wavelength $\lambda_i$ and temperature $t_j$.

In Step (1), the municipal solid waste components collected include kitchen waste, paper, plastic, rubber, fabric, cellulose, bamboo, peel and lignin.

The beneficial effects of the present invention are as follows:

The real-time detection device and method for municipal solid waste components in an incinerator of the present invention calculate component information of municipal solid waste with less error by collecting the information of the emission flame spectrum of each single component of municipal solid waste at various temperatures and the actual combustion flame emission spectrum of municipal solid waste on the incinerator grate, and calculating the flame temperature, and retrieving the appropriate single component flame emission spectrum. Compared with manual classified sampling and detection, the device and method provided by the present invention have the advantages of high efficiency, rapidness, accuracy, capability of being updated in real time, and can realize stable combustion of the municipal solid waste in the incinerator, and reduce emission of pollutants and realize efficient and clean utilization of the municipal solid waste.

The figures are marked as: 1, municipal solid waste, 2, incinerator, 3, grate, 4, primary combustion zone, 5, furnace wall, 6, observation hole, 7, optical fiber sensor, 8, spectrometer, 9, data line, 10. industrial personal computer.

DESCRIPTION OF THE EMBODIMENTS

Figure 1:
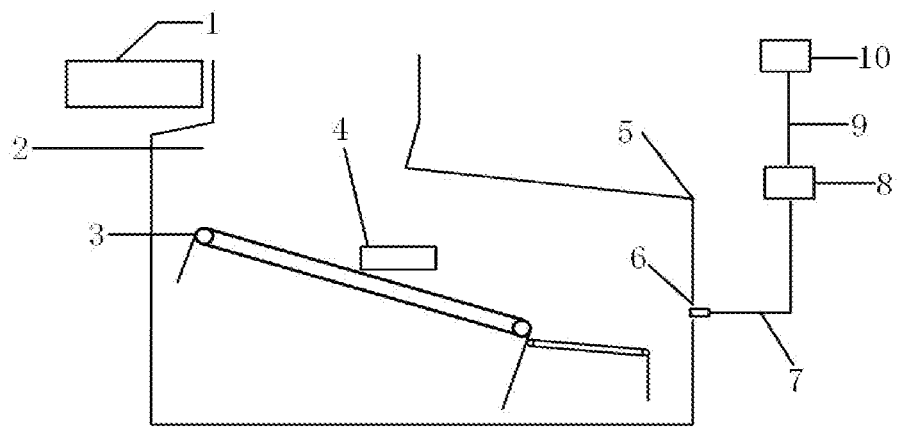
FIG. 1 is a schematic diagram of the structure a real-time detection device for municipal solid waste components in an incinerator of the present invention.

As shown in FIG. 1, the real-time detection device for municipal solid waste components in an incinerator of this embodiment includes: an incinerator 2, an optical fiber sensor 7, a spectrometer 8, an industrial personal computer 10. The mixed municipal solid waste 1 enters the incinerator 2 and is accumulated on the grate 3 for burning; an observation hole 6 is located on the furnace wall 5 of the incinerator 2, the primary combustion zone 4 of municipal solid waste is located on the grate 3; the viewing angle of optical fiber sensor 7 is opposite to the main combustion region 4 by passing through the observation hole 6; the optical fiber sensor 7 is connected to the spectrometer 8, and the spectrometer 8 is connected to the industrial personal computer 10 by the data line 9.

The working process of this embodiment is as follows: the municipal solid waste 1 enters into the incinerator 2 and is accumulated on the grate 3 to be burned to form a main combustion region 4; the optical fiber sensor 7 collects the optical signal of flame in the primary combustion zone 4 through the observation hole 6, and transmits the optical signal to the spectrometer 8; the spectrometer 8 parses the transmitted optical signal to obtain a corresponding flame emission spectrum, and transmits the spectral information to the industrial personal computer 10 through the data line 9. The domestic garbage component detection program in the industrial personal computer 10 outputs the domestic garbage component in the incinerator at the time point based on the spectral information.

Figure 2:
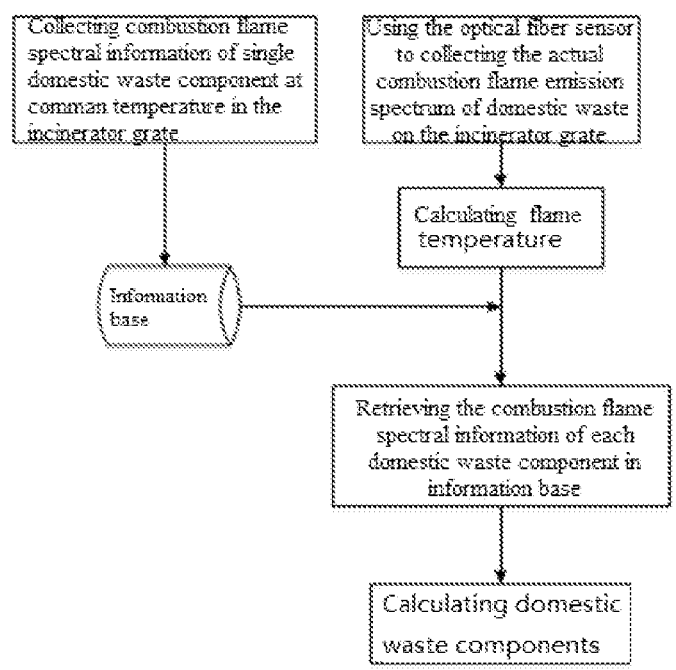
FIG. 2 is a wireframe flowchart of a real-time detection method for municipal solid waste components in an incinerator of the present invention.
Figure 3:
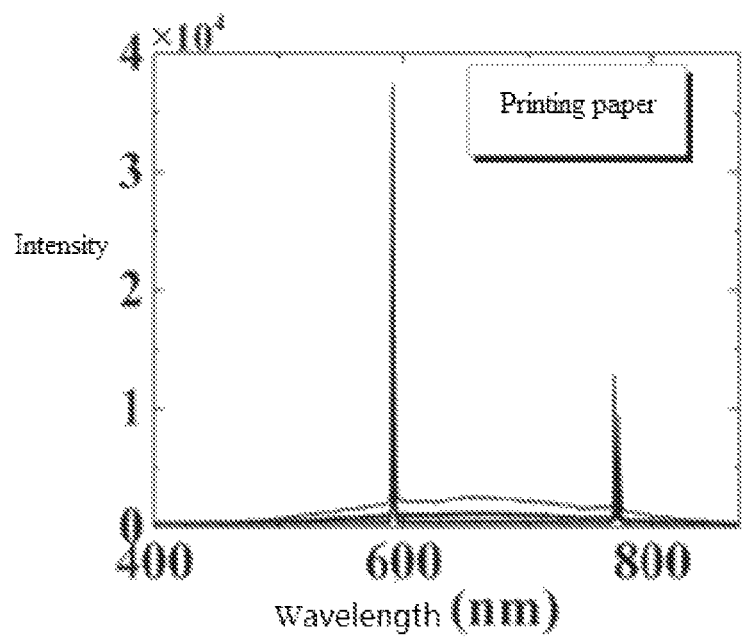
FIG. 3 is a spectrum diagram of printing paper.
Figure 4:
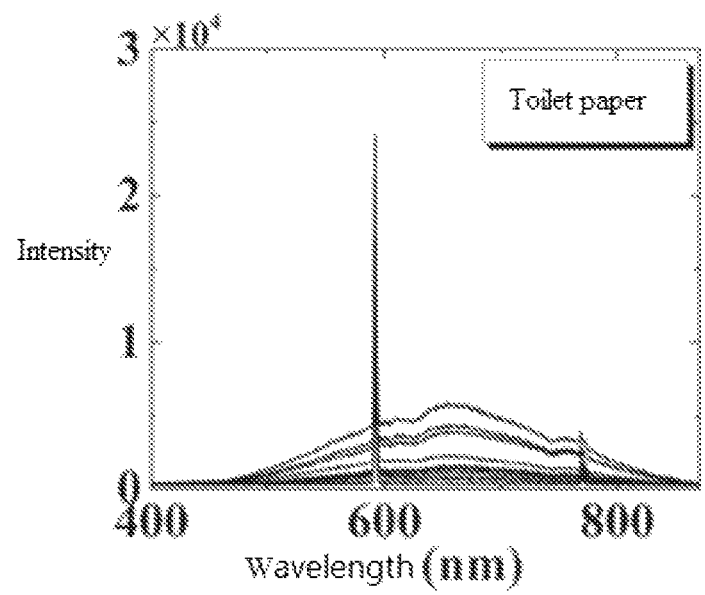
FIG. 4 is a spectrum of tissue paper.
Figure 5:
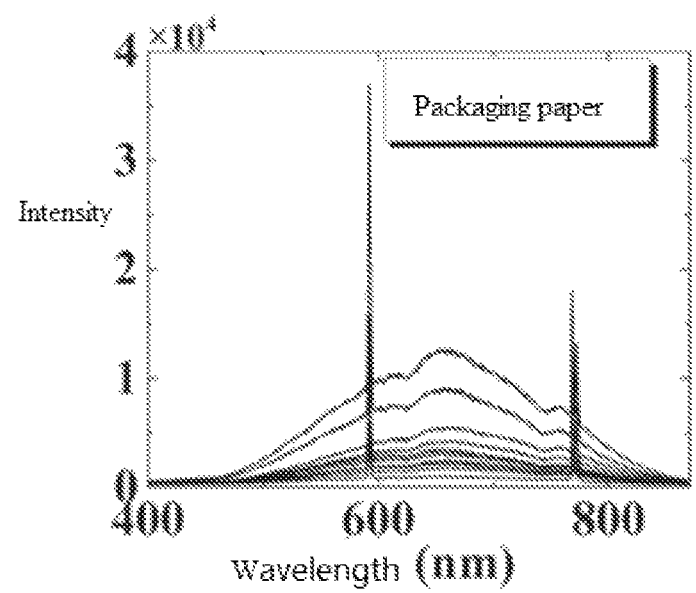
FIG. 5 is a spectrum diagram of packaging paper.
Figure 6:
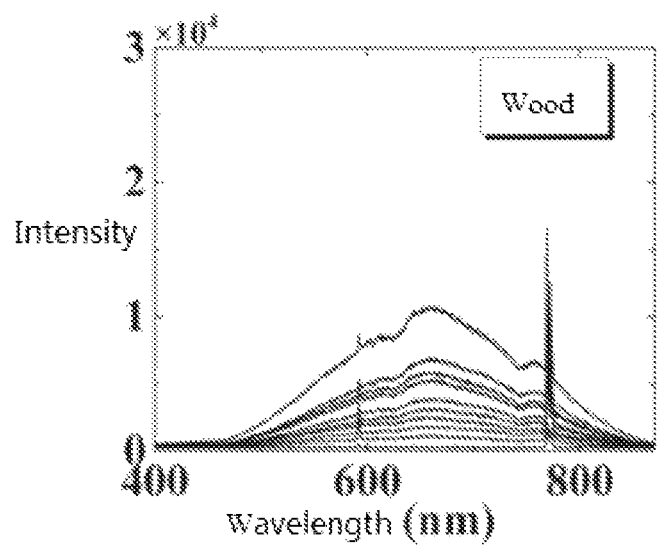
FIG. 6 is a spectrum diagram of wood.
Figure 7:
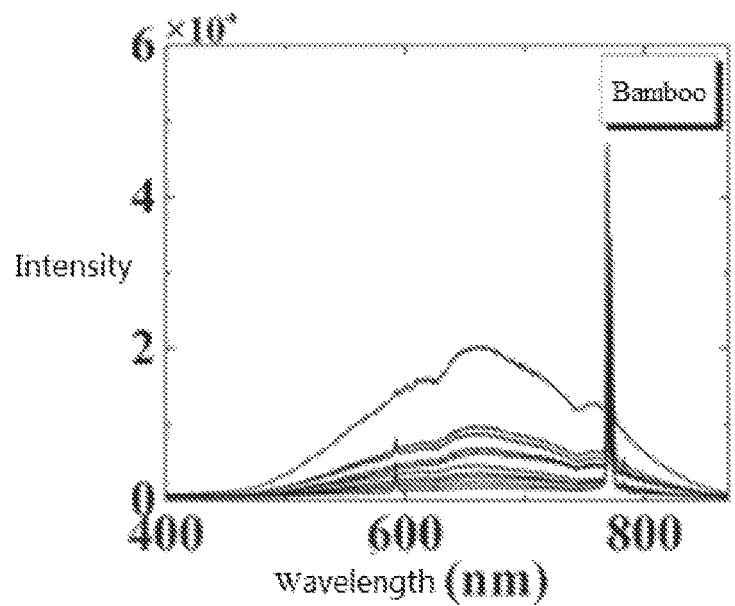
FIG. 7 is a spectrum diagram of bamboo.
Figure 8:
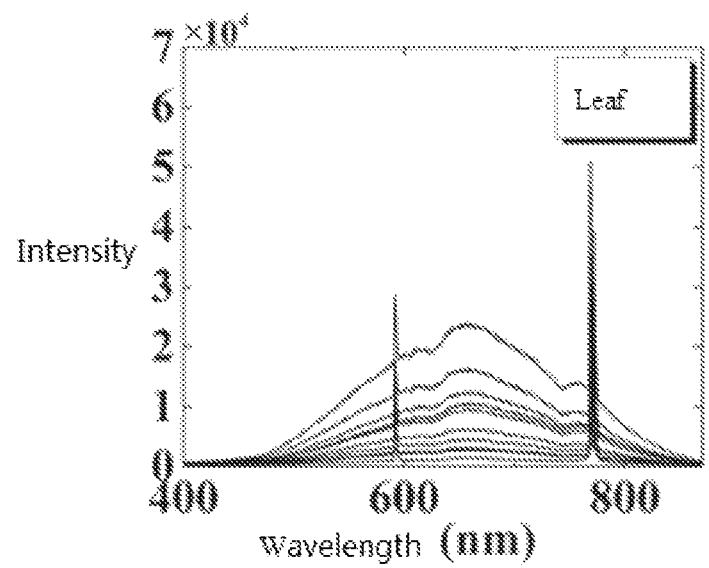
FIG. 8 is a spectrum diagram of leaves.
Figure 9:
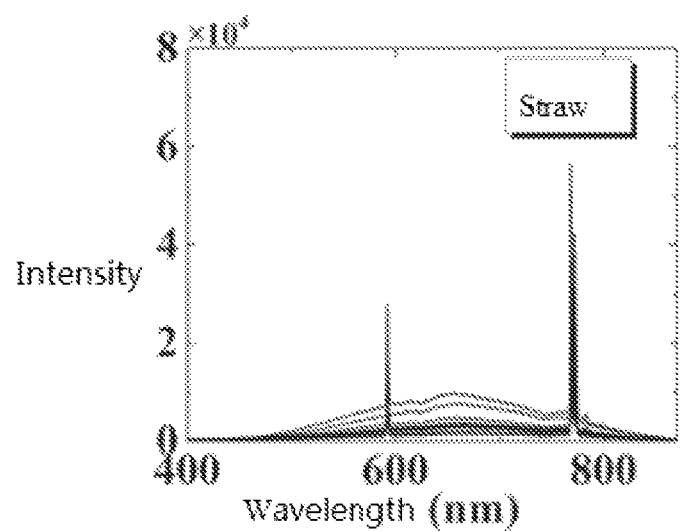
FIG. 9 is a spectrum diagram of straw.
Figure 10:
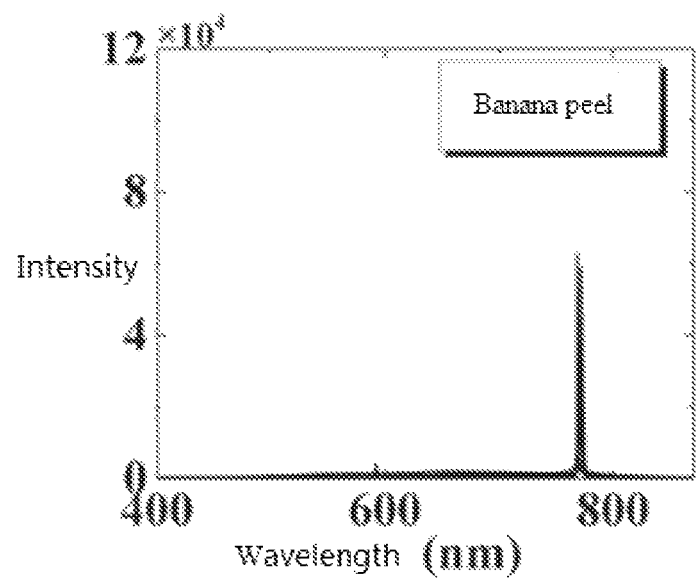
FIG. 10 is a spectrum diagram of banana peel.
Figure 11:
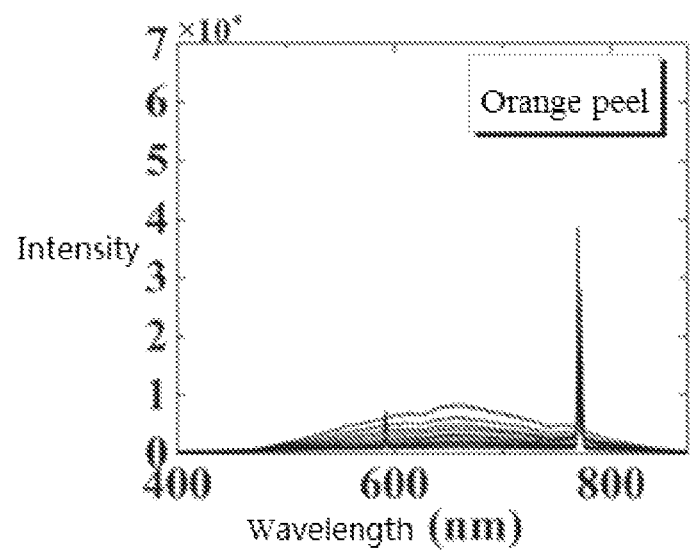
FIG. 11 is a spectrum diagram of orange peel.
Figure 12:
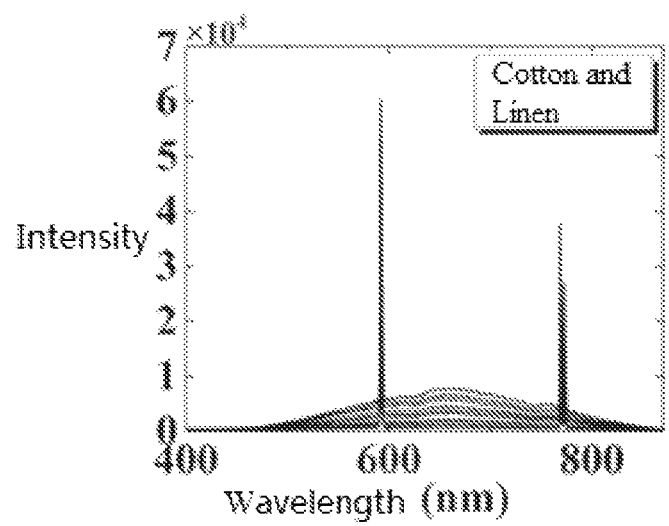
FIG. 12 is a spectrum diagram of cotton and linen.
Figure 13:
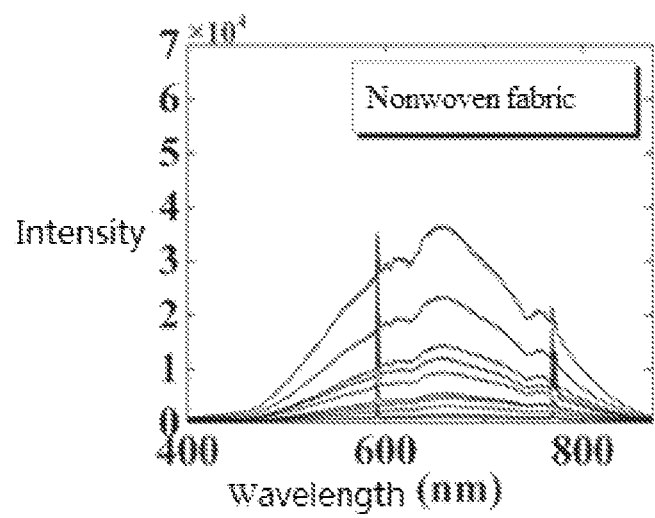
FIG. 13 is a spectrum diagram of a nonwoven fabric.
Figure 14:
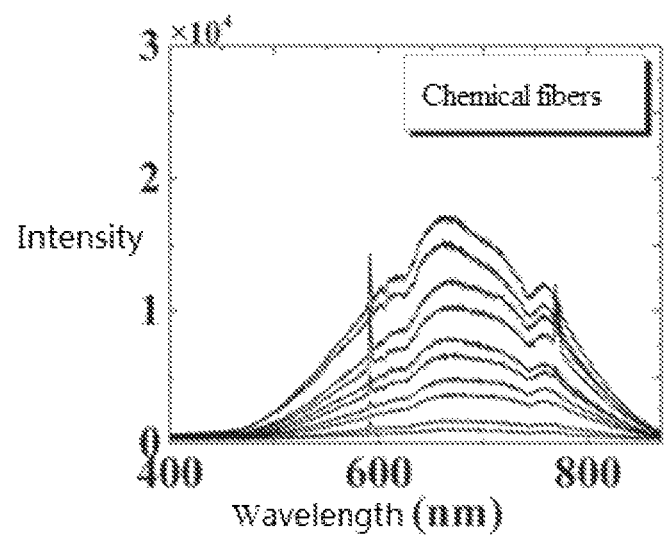
FIG. 14 is a spectrum diagram of chemical fibers.
Figure 15:
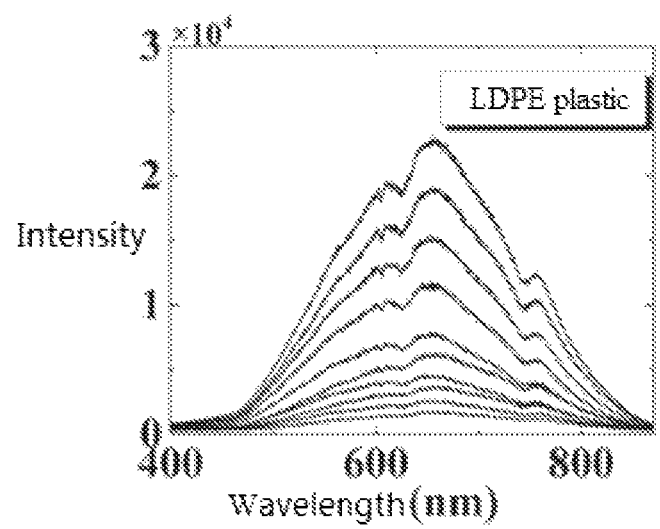
FIG. 15 is a spectrum diagram of LDPE plastic.
Figure 16:
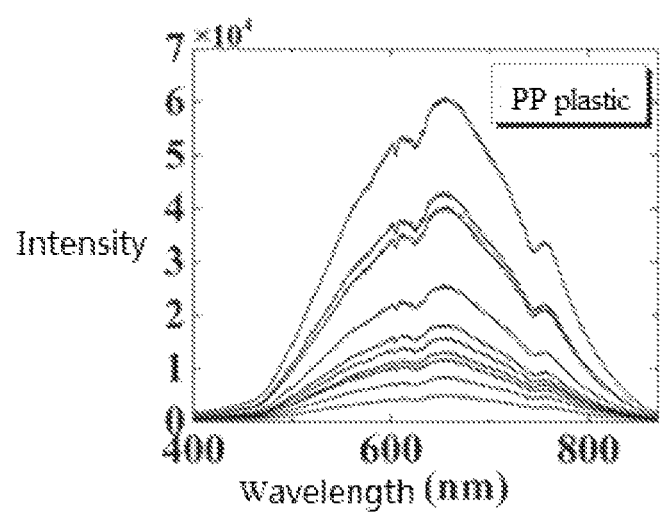
FIG. 16 is a spectrum diagram of PP plastic.
Figure 17:
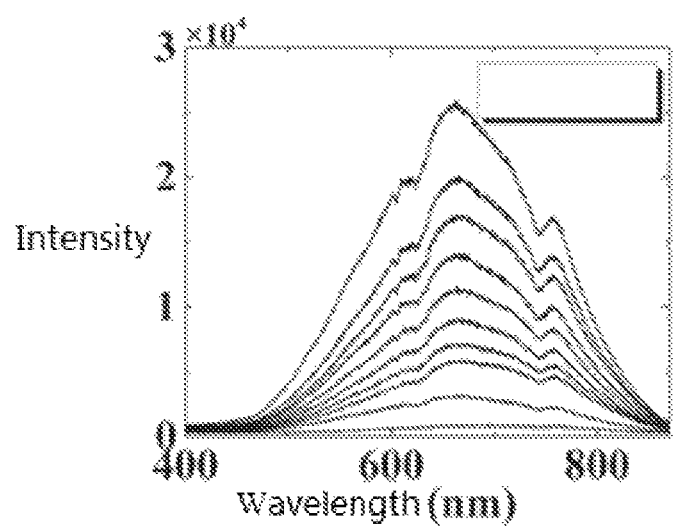
FIG. 17 is a spectrum diagram of PVC plastic.

As shown in FIG. 2, the municipal solid waste component detection program includes the following process:

(1) collecting combustion flame spectral information of the municipal solid waste components at common temperature in the incinerator and storing it in the information base;

(2) collecting combustion flame spectral information of mixed municipal solid waste through the spectrometer;

(3) calculating the flame temperature T according to the combustion flame spectral information of mixed municipal solid waste collected in Step (2);

The formula of temperature is calculated as follows:

$$E_{\lambda_i}(T) \approx (2hC_0\lambda_i^{-5}) \cdot e^{\frac{-hC_0}{K\lambda_i T}}$$

wherein, h is Planck constant, h=6.62606896(33)×10⁻³⁴ J·s; $C_0$ is the speed of vacuum light, $C_0$=299792458 m/s; K is Boltzmann constant, K=1.38064852(79)×10⁻²³ J/K; $\lambda_i$ is wavelength, the unit is nm, taking 600~800 nm in this formula, calculating the maximum value of T;

(4) setting the number of single components of municipal solid waste to be detected as N, using $X_i$ to represent the proportion of component i, i=1~N, then the proportion of each component is represented as matrix $$\begin{bmatrix} X_1 \\ \vdots \\ X_N \end{bmatrix};$$

retrieving the combustion flame spectral information of each single component at flame temperature T calculated by Step (3)

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix},$$

and the equation is obtained:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} = \begin{bmatrix} E_{\lambda_1}(T) \\ \vdots \\ E_{\lambda_i}(T) \end{bmatrix};$$

$E_{\lambda_i}(T)$ represents the flame emission characteristic line intensity of mixed municipal solid waste at wavelength $\lambda i$ and temperature T; $I_{\lambda_i,T,E_N}$ represents the flame emission characteristic line intensity of component Ei at wavelength $\lambda i$ and temperature T;

(5) solving the equation of Step (4) to obtain the proportion of each component in the municipal solid waste by using the least square method.

Figure 18:
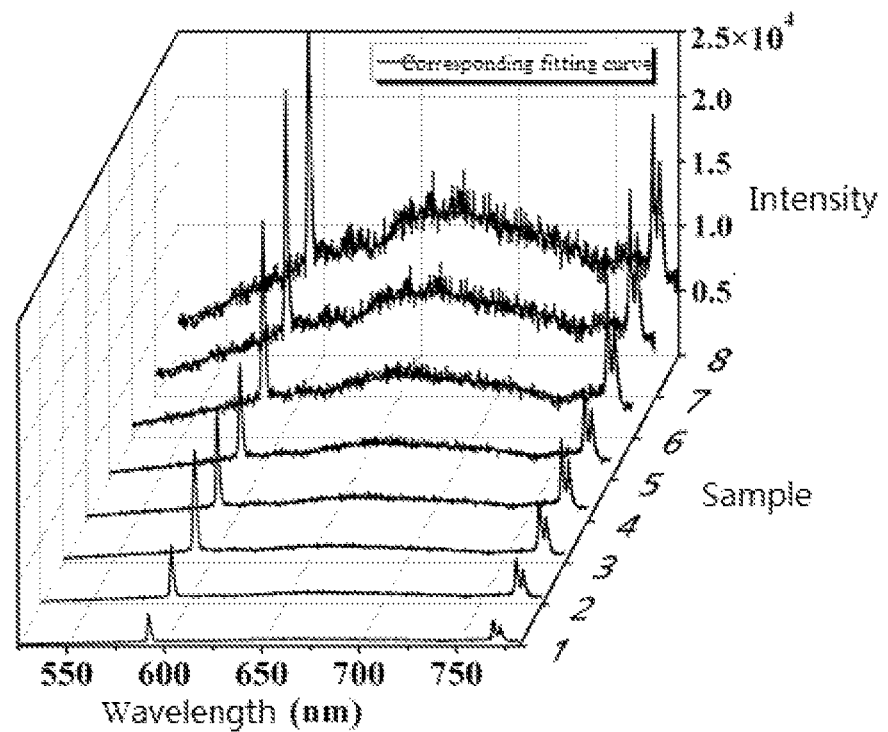
FIG. 18 is the actual flame spectrum and the flame spectrum after reconstruction of the 700 t/d incinerator.

FIG. 3~17 shows the combustion flame emission spectrum of 15 single-component waste combustion in municipal solid waste. FIG. 18 shows the flame emission spectrum of the main combustion region during the actual operation of the selected 700 T/D waste incinerator. The detection program output results are as follows:

| Sample | 1 | 2 | 3 | 4 | 5 | 6 | 7 | 8 |
|---|---|---|---|---|---|---|---|---|
| Printing paper | 0.08 | 0.08 | 0.09 | 0.07 | 0.07 | 0.07 | 0.08 | 0.08 |
| Tissue paper | 0.08 | 0.08 | 0.08 | 0.08 | 0.08 | 0.08 | 0.11 | 0.11 |
| Packaging paper | 0.14 | 0.14 | 0.14 | 0.15 | 0.14 | 0.14 | 0.03 | 0.03 |
| Wood | 0.12 | 0.11 | 0.11 | 0.11 | 0.11 | 0.11 | 0.07 | 0.08 |
| Bamboo | 0.08 | 0.08 | 0.08 | 0.07 | 0.07 | 0.07 | 0.02 | 0 |
| Leaf | 0.05 | 0.05 | 0.05 | 0.06 | 0.06 | 0.06 | 0.05 | 0.05 |
| Straw | 0.06 | 0.06 | 0.06 | 0.06 | 0.05 | 0.06 | 0.07 | 0.07 |
| Banana peel | 0.07 | 0.07 | 0.06 | 0.07 | 0.07 | 0.07 | 0.06 | 0.06 |
| Orange peel | 0.02 | 0.03 | 0.02 | 0.03 | 0.03 | 0.03 | 0.13 | 0.13 |
| Cotton and Linen | 0 | 0 | 0 | 0 | 0 | 0 | 0.05 | 0.05 |
| Nonwoven fabric | 0.07 | 0.07 | 0.07 | 0.07 | 0.07 | 0.07 | 0.06 | 0.06 |
| Chemical fibers | 0.02 | 0.01 | 0.01 | 0.01 | 0.01 | 0.01 | 0.01 | 0.01 |
| LDPE plastic | 0.01 | 0.01 | 0.01 | 0.01 | 0.01 | 0.01 | 0.15 | 0.16 |
| PVC plastic | 0.1 | 0.1 | 0.09 | 0.1 | 0.11 | 0.1 | 0.11 | 0.11 |
| PP plastic | 0.1 | 0.11 | 0.13 | 0.11 | 0.12 | 0.12 | 0 | 0 |

In summary, the present embodiment uses optical fiber sensor and spectrometer to obtain combustion flame spectrum information of municipal solid waste in an incinerator, and detects the garbage waste components in real time by basing on the combustion flame spectrum of every single garbage component and applying the least square method; the municipal solid waste is burned in an incinerator to produce flame, the optical signal of flame is collected by the optical fiber sensor, and the flame emission spectrum is obtained by the spectrometer, and the flame emission spectrum is transmitted to the industrial personal computer; the industrial personal computer uses the domestic garbage component detection program to analyze and detect the spectral information obtained, and the result of the component of the burned municipal solid waste is output; the garbage waste component detection program is a flame emission spectrum reconstruction program based on the least squares method. The program first collects the information of the emission flame spectrum of each single component of municipal solid waste at different temperatures and the actual combustion flame emission spectrum of municipal solid waste on the incinerator grate, and then gets the information of the municipal solid waste component with less error by calculating the flame temperature, retrieving the appropriate single component flame emission spectrum and using the least squares method; The recent invention solves the problems that the waste power plant lacks the knowledge of the component information of the fuel input end, and can update the component information of the waste in the incinerator in real time, optimizing the combustion condition in the incinerator, and thus the clean and efficient utilization of municipal solid waste is realized.

The invention claimed is:

1. A real-time detection device for municipal solid waste components in an incinerator, wherein, the real-time detection device comprises:
   an optical fiber sensor, which faces a combustion flame of a municipal solid waste combustion region through an observation hole in the incinerator;
   a spectrometer, which is used for receiving an optical signal of the optical fiber sensor;
   an industrial personal computer, which is used for receiving data of the spectrometer and outputting the municipal solid waste components according to a municipal solid waste component detection program;
   the municipal solid waste component detection program comprises the following process:
   (1) collecting combustion flame spectral information of the municipal solid waste components at a common temperature in the incinerator and storing the information in an information base;
   (2) collecting combustion flame spectral information of mixed municipal solid waste through the spectrometer;
   (3) calculating the flame temperature T according to the combustion flame spectral information of mixed municipal solid waste collected in Step (2);
   (4) setting the number of single component of the municipal solid waste to be detected as N, using $X_i$ to represent the proportion of component i, i=1~N, then the proportion of each component is represented as matrix $$\begin{bmatrix} X_1 \\ \vdots \\ X_N \end{bmatrix};$$

retrieving the combustion flame spectral information of each single component at flame temperature T calculated by Step (3)

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix},$$

and the equation is obtained:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} = \begin{bmatrix} E_{\lambda_1}(T) \\ \vdots \\ E_{\lambda_i}(T) \end{bmatrix};$$

$E_{\lambda,i}(T)$ represents the flame emission characteristic line intensity of mixed municipal solid waste at wavelength $\lambda i$ and temperature T; $I_{\lambda_i,T,E_N}$ represents the flame emission characteristic line intensity of component Ei at wavelength $\lambda i$ and temperature T;

(5) solving the equation of Step (4) to obtain the proportion of each component in the municipal solid waste.

2. The real-time detection device for the municipal solid waste components in the incinerator according to claim 1, wherein, in Step (5), solving the equation in step (4) by the least square method, to obtain the proportion of the municipal solid waste components.

3. The real-time detection device for the municipal solid waste components in the incinerator according to claim 1, wherein, in Step (1), the combustion flame spectral information of the municipal solid waste components at common temperature in the incinerator is represented as matrix:

$$E_X = \begin{bmatrix} I_{\lambda_1,t_1} & \cdots & I_{\lambda_1,t_j} \\ \vdots & \ddots & \vdots \\ I_{\lambda_i,t_1} & \cdots & I_{\lambda_i,t_j} \end{bmatrix}$$

wherein X represents a single component of the municipal solid waste;

$I_{\lambda i, tj}$ represents the flame emission characteristic line intensity at wavelength $\lambda_i$ and temperature $t_j$.

4. The real-time detection device for the municipal solid waste components in the incinerator according to claim 1, wherein, in Step (1), the municipal solid waste components collected include kitchen waste, paper, plastic, rubber, fabric, cellulose, bamboo, peel and lignin.

5. A real-time detection method for municipal solid waste components in an incinerator, wherein, the real-time detection method comprises following process:
  (1) collecting combustion flame spectral information of the municipal solid waste components at common temperature in the incinerator and storing the information in an information base;
  (2) collecting combustion flame spectral information of mixed municipal solid waste through the spectrometer;
  (3) calculating the flame temperature T according to the combustion flame spectral information of mixed municipal solid waste collected in Step (2);
  (4) setting the number of single components of the municipal solid waste to be detected as N, using $X_i$ to represent the proportion of component i, i=1~N, then the proportion of each component is represented as matrix $$\begin{bmatrix} X_1 \\ \vdots \\ X_N \end{bmatrix};$$

retrieving the combustion flame spectral information of each single component at flame temperature T calculated by Step(3)

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix},$$

and the equation is obtained:

$$\begin{bmatrix} I_{\lambda_1,T,E_1} & \cdots & I_{\lambda_1,T,E_N} \\ \vdots & \ddots & \vdots \\ I_{\lambda_i,T,E_1} & \cdots & I_{\lambda_i,T,E_N} \end{bmatrix} \begin{bmatrix} X_1 \\ \vdots \\ X_N \end{bmatrix} = \begin{bmatrix} E_{\lambda_1}(T) \\ \vdots \\ E_{\lambda_i}(T) \end{bmatrix};$$

$E_{\lambda i}(T)$ represents the flame emission characteristic line intensity of mixed municipal solid waste at wavelength $\lambda i$ and temperature T; $I_{\lambda i, TE_N}$ represents the flame emission characteristic line intensity of component Ei at wavelength $\lambda i$ and temperature T;

(5) solving the equation of Step (4) to obtain the proportion of each component in the municipal solid waste.

6. The real-time detection method for the municipal solid waste components in the incinerator according to claim 5, wherein, in Step (5), solving the equation in step (4) by the least square method, to obtain the proportion of the municipal solid waste components.

7. The real-time detection method for the municipal solid waste components in the incinerator according to claim 5, wherein, in Step (1), the combustion flame spectral information of the municipal solid waste components at common temperature in the incinerator is represented as matrix:

$$E_X = \begin{bmatrix} I_{\lambda_1,t_1} & \cdots & I_{\lambda_1,t_j} \\ \vdots & \ddots & \vdots \\ I_{\lambda_i,t_1} & \cdots & I_{\lambda_i,t_j} \end{bmatrix}$$

wherein X represents a single component of the municipal solid waste;

$I_{\lambda i, tj}$ represents the flame emission characteristic line intensity at wavelength $\lambda_i$ and temperature $t_j$.

8. The real-time detection method for the municipal solid waste components in the incinerator according to claim 5, wherein, in Step (1), the municipal solid waste components collected include kitchen waste, paper, plastic, rubber, fabric, cellulose, bamboo, peel and lignin.

\* \* \* \* \*